US009760309B2

(12) United States Patent
Ioannou et al.

(10) Patent No.: US 9,760,309 B2
(45) Date of Patent: Sep. 12, 2017

(54) METHOD AND DEVICE FOR MANAGING A MEMORY

(71) Applicant: International Business Machines Corporation, Armonk, NY (US)

(72) Inventors: Nikolas Ioannou, Rueschlikon (CH); Ioannis Koltsidas, Rueschlikon (CH); Roman A. Pletka, Rueschlikon (CH); Sasa Tomic, Rueschlikon (CH); Thomas D. Weigold, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 312 days.

(21) Appl. No.: 14/497,887

(22) Filed: Sep. 26, 2014

(65) Prior Publication Data

US 2015/0169237 A1 Jun. 18, 2015

(30) Foreign Application Priority Data

Dec. 17, 2013 (GB) .................................. 1322290.6

(51) Int. Cl.
*G06F 12/00* (2006.01)
*G06F 3/06* (2006.01)
*G06F 12/02* (2006.01)

(52) U.S. Cl.
CPC .......... *G06F 3/0656* (2013.01); *G06F 3/0616* (2013.01); *G06F 3/0679* (2013.01); *G06F 12/0246* (2013.01); *G06F 2212/1016* (2013.01); *G06F 2212/1036* (2013.01); *G06F 2212/7205* (2013.01)

(58) Field of Classification Search
None
See application file for complete search history.

(56) References Cited

U.S. PATENT DOCUMENTS 8,117,396 B1 * 2/2012 Fair ..................... G06F 12/0866
711/133
2008/0235306 A1 * 9/2008 Kim .................. G06F 17/30336
707/999.206

(Continued)

OTHER PUBLICATIONS

Event-driven gate-level logic simulation using a timing wheel data structure, ECE-470 Digital Design II, Nov. 17, 2011.*

(Continued)

*Primary Examiner* — Brian Peugh
*Assistant Examiner* — Jason Blust
(74) *Attorney, Agent, or Firm* — Cantor Colburn LLP

(57) ABSTRACT

A method for managing a memory is disclosed, the memory including a set of units and a unit comprising a set of pages, wherein a unit of the set of units is erasable as a whole by a unit reclaiming process resulting in a free unit available for writing data to. The method includes maintaining a first pool of units available for reclamation by the unit reclaiming process; maintaining a second pool of units not available for reclamation by the unit reclaiming process; moving a first unit from the first pool to the second pool in response to invalidating a first one of the pages contained in the first unit; returning the first unit from the second pool to the first pool after a defined number of units of the set have been written; and selecting a unit out of the first pool for reclamation by the unit reclaiming process.

23 Claims, 6 Drawing Sheets

(56) References Cited

U.S. PATENT DOCUMENTS

| | | | |
|---|---|---|---|
| 2011/0029715 A1* | 2/2011 | Hu | G06F 12/0246 |
| | | | 711/103 |
| 2011/0283049 A1* | 11/2011 | Kang | G06F 12/0246 |
| | | | 711/103 |
| 2012/0102297 A1* | 4/2012 | Haines | G06F 12/0246 |
| | | | 711/209 |

OTHER PUBLICATIONS

IPO UK Search Report, Application No. GB1322290.6, Patents Act 1977: Search Report Under Section 17(5), Date Mailed: Jun. 2, 2014, pp. 1-3.

J. Menon, et al., "An Age-Threshold Algorithm for Garbage Collection in Log-Structured Arrays and File Systems," High Performance Computing Systems and Applications, 1998, pp. 119-132.

L. Chang, et al., "Real-Time Garbage Collection for Flash-Memory Storage Systems of Real-Time Embedded Systems," ACM Transactions on Embedded Computing Systems, vol. 3, No. 4, Nov. 2004, pp. 837-863.

M. Rosenblum, et al., "The Design and Implementation of a Log-Structured File System," ACM Transactions on Computer Systems, vol. 10, No. 1, Feb. 1992, pp. 26-52.

X. Hu, et al., "Container Marking: Combining Data Placement, Garbage Collection and Wear Levelling for Flash," 19th Annual IEEE International Symposium on Modelling, Analysis, and Simulation of Computer and Telecommunication Systems, 2011, pp. 237-247.

* cited by examiner

METHOD AND DEVICE FOR MANAGING A MEMORY

FOREIGN PRIORITY

This application claims priority to Great Britain Patent Application No. 1322290.6, filed Dec. 17, 2013, and all the benefits accruing therefrom under 35 U.S.C. §119, the contents of which in its entirety are herein incorporated by reference.

BACKGROUND

The present invention relates to a method for managing a memory, and to a memory controller.

Solid state memory devices encompass rewritable non-volatile memory devices which may use electronic circuitry for storing data. Currently, solid state memory devices start replacing conventional storage devices such as hard disk drives and optical disk drives in some arenas, such as in mass storage applications for laptops or desktops. Solid state memory devices are also investigated for replacing conventional storage devices in other areas such as in enterprise storage systems. This is because solid state memory devices offer exceptional bandwidth as well as excellent random I/O (input/output) performance along with an appreciated robustness due to lack of moveable parts.

However, writing data to a solid-state memory device such as a flash memory device requires paying attention to specifics in the flash technology: NAND flash memory is organized in pages and blocks. Multiple pages form a block. While read and write operations can be applied to pages as a smallest entity of such operation, erase operations can only be applied to entire blocks. And while in other storage technologies outdated data can simply be overwritten by up-to-date data, flash technology requires an erase operation before up-to-date data can be written to an erased block.

For the reason that in flash technology erase operations take much longer than read or write operations a writing technique called "write out of place" is applied in which new or updated data is written to some free page offered by a free page allocator instead of writing it to the same page where the outdated data resides. The page containing the outdated data is marked as invalid page.

The more data is written over time, the less free pages may be offered and new blocks may need to be reclaimed for a free block queue, i.e., a queue for providing free, i.e., erased blocks for writing new or updated data to. New free blocks need to be reclaimed from blocks filled with valid and/or invalid data. The block reclaiming process—also known as "garbage collection process"—first identifies blocks for cleaning based on a given policy. Then valid data still residing in these blocks is copied (relocated) to other blocks, and finally the blocks that now are free from valid data are erased and become available again for rewriting. Consequently, the block reclaiming process introduces additional read and write operations, the extent of which depends on the specific policy deployed as well as on system parameters.

SUMMARY

In one embodiment, a method for managing a memory is disclosed, the memory including a set of units and a unit including a set of pages, wherein a unit of the set of units is erasable as a whole by a unit reclaiming process resulting in a free unit available for writing data to, and wherein data updates are performed by writing data updates out-of-place, wherein data updates to outdated data are written to a page different from a page containing the outdated data, and wherein the page containing the outdated data is invalid, while a page containing up-to-date data is a valid page. The method includes maintaining a first pool of units available for reclamation by the unit reclaiming process; maintaining a second pool of units not available for reclamation by the unit reclaiming process; moving a first unit from the first pool to the second pool in response to invalidating a first one of the pages contained in the first unit; returning the first unit from the second pool to the first pool after a defined number of units of the set have been written; and selecting a unit out of the first pool for reclamation by the unit reclaiming process.

In another embodiment, a method for managing a memory is disclosed, the memory including a set of units and a unit including a set of pages, wherein a unit of the set of units is erasable as a whole by a unit reclaiming process resulting in a free unit available for writing data to, and wherein data updates are performed by writing data updates out-of-place, wherein data updates to outdated data are written to a page different from a page containing the outdated data, and wherein the page containing the outdated data is invalid, while a page containing up-to-date data is a valid page. The method includes maintaining a first pool of units available for reclamation by the unit reclaiming process; maintaining a second pool of units not available for reclamation by the unit reclaiming process, which second pool comprises a First-In-First-Out buffer; moving a first unit from the first pool to the second pool in response to invalidating a first one of the pages contained in the first unit; in response to moving the first unit from the first pool to the second pool returning another unit from the second pool to the first pool; and selecting a unit out of the first pool for reclamation by the unit reclaiming process.

In another embodiment, a memory controller for managing a memory including a set of units and a unit including a set of subunits is disclosed, wherein a unit of the set of units is erasable as a whole by a unit reclaiming process resulting in a free unit available for writing data to, and wherein data updates are performed by writing data updates out-of-place, wherein data updates to outdated data are written to a subunit different from a subunit containing the outdated data; and wherein the subunit containing the outdated data is invalid, while a subunit containing up-to-date data is a valid subunit. The memory controller is configured to: maintain a first pool of units available for reclamation by the unit reclaiming process; maintain a second pool of units not available for reclamation by the unit reclaiming process; move a first unit from the first pool to the second pool in response to invalidating a first one of the pages contained in the first unit; return the first unit from the second pool to the first pool after a defined number of units of the set have been written; and select a unit out of the first pool for reclamation by the unit reclaiming process.

BRIEF DESCRIPTION OF THE SEVERAL VIEWS OF THE DRAWINGS

The invention and its embodiments will be more fully appreciated by reference to the following detailed description of presently preferred but nonetheless illustrative embodiments in accordance with the present invention when taken in conjunction with the accompanying drawings.

DETAILED DESCRIPTION

Figure 1:
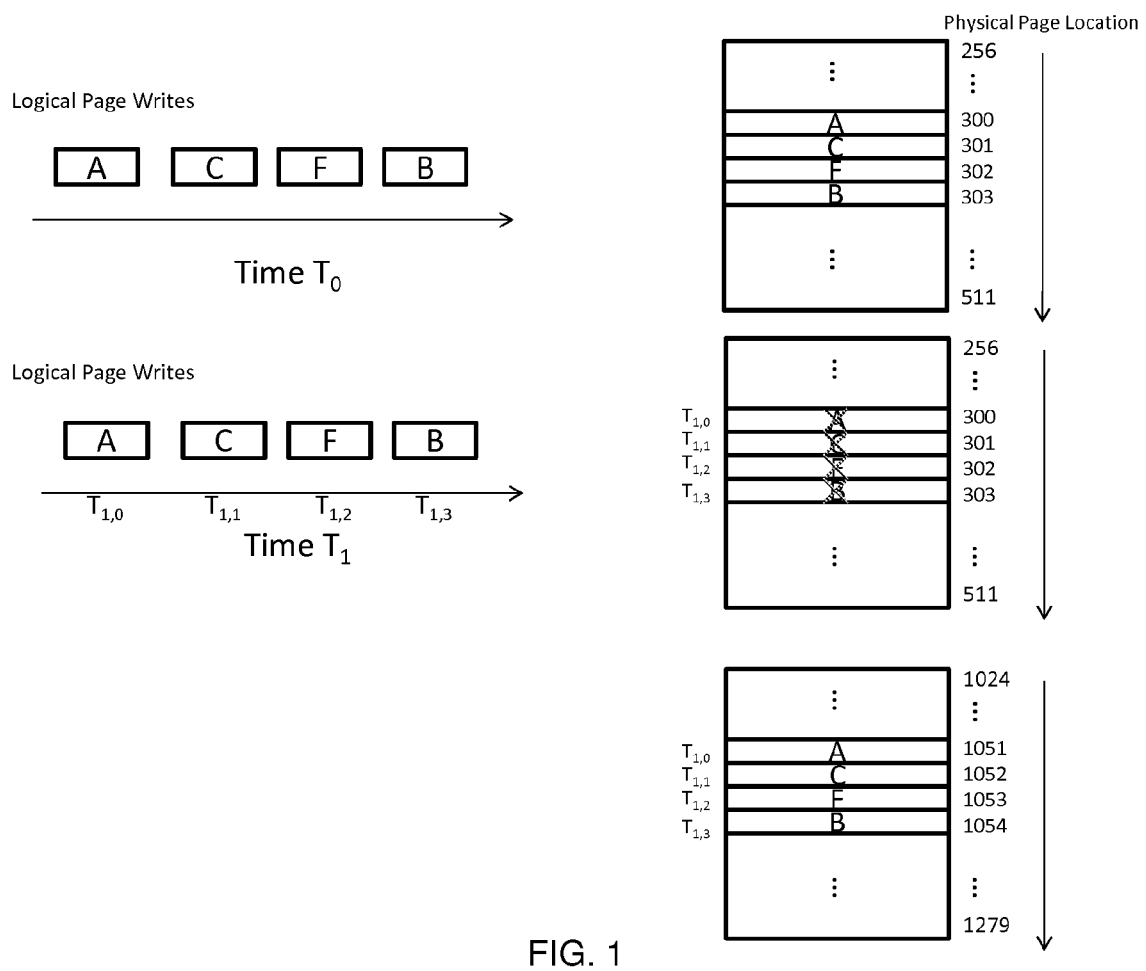
FIG. 1 is a scenario of updating data in a log structured array.

According to one aspect of the invention, a method is provided for managing a memory, the memory comprising a set of units and a unit comprising a set of pages, wherein a unit of the set of units is erasable as a whole by a unit reclaiming process resulting in a free unit available for writing data to; and wherein data updates are performed by writing data updates out-of-place, wherein data updates to outdated data are written to a page different from a page containing the outdated data; and wherein the page containing the outdated data is invalid, while a page containing up-to-date data is a valid page. A first pool of units available for reclamation by the unit reclaiming process is maintained. A second pool of units not available for reclamation by the unit reclaiming process is maintained. A unit is moved from the first pool to the second pool in response to invalidating a first one of the pages contained in the first unit. The first unit is returned from the second pool to the first pool after a defined number of units of the set have been written. A unit out of the first pool is selected for reclamation by the unit reclaiming process.

In embodiments, the method may comprise one or more of the following features: a unit of the set is written once the unit solely comprises either valid or invalid pages; the second pool comprises a circular buffer of queues for buffering units therein, and an index pointer for pointing at one of the queues; moving a unit from the first pool to the second pool comprises removing the first unit from the first pool and adding the first unit to the queue the index pointer presently points at; the index pointer is incremented for pointing at a next queue of the circular buffer in response to a unit of the set being written; in response to the index pointer being incremented to point to the next queue all units being arranged in the next queue are returned to the first pool by removing these units from the next queue and adding these units to the first pool; the second pool comprises a single queue for buffering units therein, wherein moving a unit from the first pool to the second pool comprises removing the first unit from the first pool, adding the first unit to the single queue and assigning a timestamp to the first unit for indicating a number of units of the set written until the move, wherein in response to a unit of the set being written, a subset of units is determined from the single queue comprising all units with a timestamp equal to a current value of a reference write timestamp indicating a number of written units in the set, minus a defined number of units to be written for delay purposes, and wherein the determined subset of units is returned to the first pool by removing the units thereof from the single queue and adding these units to the first pool; the first pool comprises bins each bin being reserved for units comprising a number of invalid pages which number falls in a defined range of one or more invalid pages associate with the subject bin; in response to a trigger event the unit reclaiming process selects at least one unit from the bin populated with the units containing the highest number of invalid pages for reclamation; valid pages of the at least one unit selected are relocated to other units, and after relocation the at least one unit is erased; the trigger event is defined by a number of units in a third pool falling below a threshold, which third pool comprises units being erased and not written yet; returning a unit from the second pool to the first pool comprises determining one of the bins for adding the unit to dependent on a present number of invalid pages in the first unit, and adding the first unit to the determined bin.

According to another aspect of the invention, a method is provided for managing a memory, the memory comprising a set of units and a unit comprising a set of pages, wherein a unit of the set of units is erasable as a whole by a unit reclaiming process resulting in a free unit available for writing data to; and wherein data updates are performed by writing data updates out-of-place, wherein data updates to outdated data are written to a page different from a page containing the outdated data; and wherein the page containing the outdated data is invalid, while a page containing up-to-date data is a valid page. A first pool of units available for reclamation by the unit reclaiming process is maintained. A second pool of units not available for reclamation by the unit reclaiming process is maintained, which second pool comprises a First-In-First-Out buffer. A unit is moved from the first pool to the second pool in response to invalidating a first one of the pages contained in the first unit. In response to moving the unit from the first pool to the second pool another unit is returned from the second pool to the first pool, and a unit is selected out of the first pool for reclamation by the unit reclaiming process.

According to a further aspect of the present invention, a computer program product is provided comprising a computer readable medium having computer readable program code embodied therewith, the computer readable program code comprising computer readable program code configured to perform a method according to any one of the preceding embodiments.

According to a further aspect of the present invention a memory controller is provided for managing a memory comprising a set of units and a unit comprising a set of subunits, wherein a unit of the set of units is erasable as a whole by a unit reclaiming process resulting in a free unit available for writing data to, and wherein data updates are performed by writing data updates out-of-place, wherein data updates to outdated data are written to a subunit different from a subunit containing the outdated data; and wherein the subunit containing the outdated data is invalid, while a subunit containing up-to-date data is a valid subunit. The memory controller is configured to maintain a first pool of units available for reclamation by the unit reclaiming process, to maintain a second pool of units not available for reclamation by the unit reclaiming process, to move a unit from the first pool to the second pool in response to invalidating a first one of the pages contained in the first unit, to return the first unit from the second pool to the first pool after a defined number of units of the set have been written, and to select a unit out of the first pool for reclamation by the unit reclaiming process.

In embodiments, the memory controller may comprise one or more of the following features: the second pool comprises a circular buffer of queues for buffering units therein, and an index pointer for pointing at one of the queues; the memory controller is configured to move a unit from the first pool to the second pool by removing the first unit from the first pool and adding the first unit to the queue the index pointer presently points at; the memory controller is configured to increment the index pointer for pointing at a next queue of the circular buffer in response to a unit of the set being written; the memory controller is configured to return all units being arranged in the next queue to the first pool in response to the index pointer being incremented for pointing to the next queue.

According to a further aspect of the present invention a storage device is provided comprising a memory comprising a set of units and a unit comprising a set of subunits, wherein a unit of the set of units is erasable as a whole by a unit reclaiming process resulting in a free unit available for writing data to, and wherein data updates are performed by writing data updates out-of-place, wherein data updates to outdated data are written to a subunit different from a subunit containing the outdated data; and wherein the subunit containing the outdated data is invalid, while a subunit containing up-to-date data is a valid subunit. The storage device further comprises a memory controller according to any one of the preceding embodiments.

It is understood that method operations may be executed in a different order than listed in a method claim. Such different order shall also be included in the scope of such claim as is the order of operations as presently listed.

Embodiments described in relation to the aspect of a method shall also be considered as embodiments disclosed in connection with any of the other categories such as the apparatus, the computer program product, etc.

As an introduction to the following description, it is first pointed at a general aspect of the invention, concerning a memory controller as well as a method for managing a computerized memory which memory comprises a set of units for storing data wherein a unit of the set of units is erasable as a whole by a unit reclaiming process resulting in a free unit available for writing data to.

Performance characteristics of NAND Flash-based solid state disks (SSD) are fundamentally different from traditional hard disk drives (HDDs). Data is organized in pages of typically 4, 8, or 16 KB sizes. Page read operations are typically one order of magnitude faster than write operations and latency neither depends on the current nor the previous location of operations. However, memory locations are to be erased prior to writing to them. The size of an erase block is typically 256 pages and the erase operations takes approximately one order of magnitude more time than a page program operation. Due to these intrinsic properties of the NAND Flash technology SSDs write data out-of-place requiring a mapping table that maps logical to physical addresses called logical-to-physical table (LPT).

As Flash chips/blocks/pages may be exposed to errors or completely fail due to limited endurance or other reasons, additional redundancy may be used within Flash pages, e.g., error correction codes (ECC) such as BCH as well as across Flash chips, e.g., RAID-5 or RAID-6 like schemes. While the addition of ECC in pages is straightforward, the organization of Flash blocks into RAID-like stripes is more complex because individual blocks preferably retire over time requiring either to reorganize the stripes or to shrink the capacity of the stripe. As the organization of stripes together with the LPT define the placement of data, SSDs today may utilize a so-called log-structured array (LSA) architecture which combines these two methods.

With out-of-place writes, a write operation will write new data to a new location in Flash memory, update the mapping information, and effectively invalidate data at the old location. The invalidated data location cannot be reused until the entire block it belongs to is erased. Before erasing, though, the block will be reclaimed, also known as garbage-collected, which means that any valid data in the block is relocated to a new block. Reclamation of a block is typically deferred for as long as possible to reduce the number of valid pages to be relocated. Pages that are relocated cause additional write operations. The additional write operations constitute write amplification. Since NAND Flash has limited endurance, i.e., each cell can only endure a limited number of program/erase cycles, it is desired to achieve low write amplification. With shrinking technology node in NAND Flash, endurance is decreasing, hence making any sort of write reduction or write elimination even more important.

While the previous explanations refer to NAND Flash memory, it is emphasized that any memory technology is addressed by the present invention that is organized in blocks wherein a block may the physical entity to be erased in its entirety. Hence, in the context of the present invention, a block may represent a Flash block, but may represent any other such entity in a different memory technology. As a result a block may contain pages as sub-units, wherein a page in one embodiment may be a Flash page, however, in other embodiments may be another sub-unit of a block subject to the memory technology.

In the present application, the entity a reclaiming process operates on shall be denoted as unit. In one embodiment, a unit may be a block. In another embodiment, a unit may comprise multiple physical blocks, e.g., a stripe of blocks such as used in RAID schemes. Specifically, and with reference to Flash technology, a unit may be a single physical Flash block or may be any multiple of the physical Flash block. For instance, in a RAID scheme multiple Flash blocks may be grouped together in a block stripe: Since a RAID parity may be computed against data in all blocks participating in a stripe, these blocks cannot be reclaimed individually. Rather, the full stripe preferably is the logical entity to be garbage-collected.

The reclaiming preferably entails identifying units to be reclaimed for future usage and refers to relocating any valid logical pages within an identified unit to new physical pages to allow for erasing the entire unit and subsequently make it ready to be populated with new pages. The amount of valid data relocated in this process is referred to as garbage-collection induced write amplification.

Aiming at low write amplification, the following considerations may be taken into account: In a memory controller write operations in the logical space such as the writing of user data are transformed into coalesced write operations in the physical space, i.e., the memory. Any write workload in the logical space will thus be transformed into a "sequential" workload in the physical space, e.g., by writing entire blocks of the memory space. In a workload that exhibits temporal locality in its write operations such a log-structured memory controller would therefore effectively map the temporal locality of write operations at the logical space into spatial locality at the physical space. Consequently, a recurring pattern in a workload's sequence of writes would be demonstrated as consecutive overwrites in a block of pages in the physical space.

FIG. 1 depicts an example of a workload exhibiting recurring patterns in its write operations. At time T0, a sequence of logical page write operations to logical locations A, C, F and B is received at the memory controller. These write operations are placed by the memory controller in the current open unit for writing at the consecutive physical locations 300, 301, 302, and 303 respectively. At time T1, the same sequence of logical write operations may be repeated. This translates to consecutive invalidations of physical locations 300, 301, 302, and 303 at times T1,0, T1,1, T1,2, and T1,3 respectively, with the new data being placed in physical locations 1051, 1052, 1053, and 1054.

Given that many common workloads, i.e., data to be written, have the above property of consecutive updates to the same data, write amplification is increased since each time the same data is updated, the updated data is written out of place, the current page of data is invalidated, and the invalidation of pages may in turn directly or indirectly trigger a unit reclaiming process, in which valid pages of the unit in question are relocated which again increases write amplification. Hence, it is presently proposed to delay a unit that is updated from being available to the unit reclaiming process for a certain time. During this time, the pages that were written may be updated again without every single update potentially initializing a unit reclaiming operation.

For managing this approach, it is preferred that two pools are provided. In a first pool, the units are assembled that are available for reclaiming. This implies that at a certain point in time a reclaiming engine may act on the units assigned to the first pool and may reclaim one or more units therefrom. The first pool is also referred to as reclaiming structure. In a second pool, units are assembled that are not available for reclaiming. Hence, the reclaiming engine may not select units from this second pool for reclaiming purposes. The second pool is also referred to as delay structure. Both of the pools may be assigned dedicated memory space. Alternatively, one or more of the pools may be understood as data structure to which units of the set are assigned to. While in the following, a process managing a unit reclamation and acting on the first pool may be referred to as a reclaiming engine, a process managing the delay of units and acting on the second pool may also be referred to as delay engine. Both engines may be implemented by the same controller, which in one embodiment may be a memory controller.

In a first embodiment, a unit will only be considered for unit reclaiming after a first logical page thereof is invalidated and after the system has seen a certain number of unit writes. The first logical page invalidation implies that a portion of logical data is requested to be updated and as such is desired to be overwritten by updated data. It may be any page of the unit that may be updated first. Hence, the subject page becomes invalidated. A unit write is achieved when there are no more free pages in this unit to write data to. In other words, a written unit solely comprises either valid or invalid pages, but no more pages to write data to. The number of unit writes is preferably the number of unit writes within the set of units. By the above approach, the subject unit is effectively delayed from being considered for unit reclamation/garbage collection the moment it sees one or more overwrites.

Figure 2:
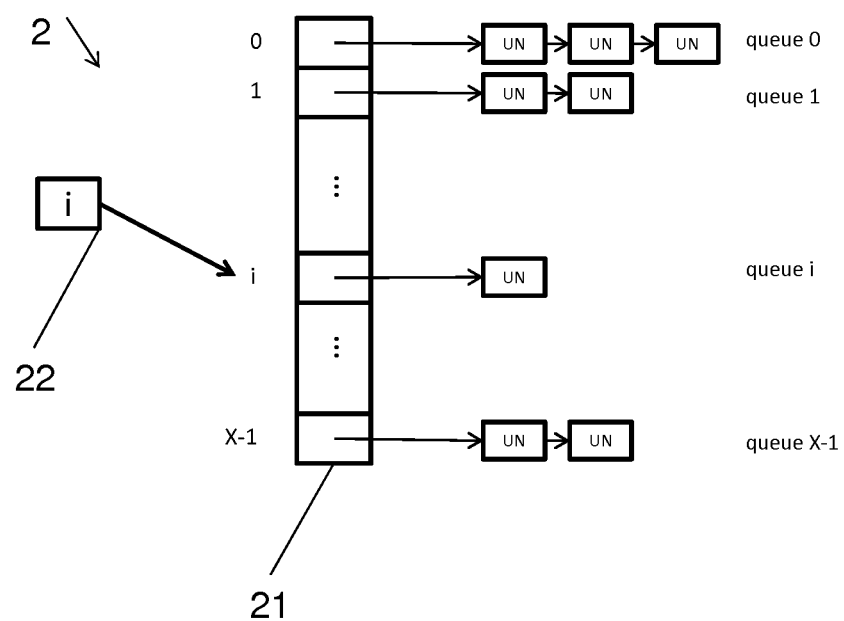
FIG. 2 is a circular buffer structure as used in an embodiment of the present invention.

For implementing the above approach, in an exemplary embodiment a fixed size circular buffer 21 of queues is introduced as second pool 2, such as is shown in FIG. 2. The circular buffer 21 acts as a delay structure for delaying units from being considered for reclamation. The buffer 21 may contain a number of X elements [0 . . . .X−1], each of which elements points to or comprises a queue for units not available for reclamation. An index pointer 22 is provided for pointing at one queue of the buffer 21. The index pointer 22 switches to the next queue when a criterion is fulfilled. When pointing at the queue X−1, the index pointer 22 may return in a next operation to the beginning of the buffer 21 and point to queue 0 such that a circular buffer is implemented. In the present example of FIG. 2, queue 0 presently holds three different units UN, queue 1 two units UN, and so on.

Figure 3:
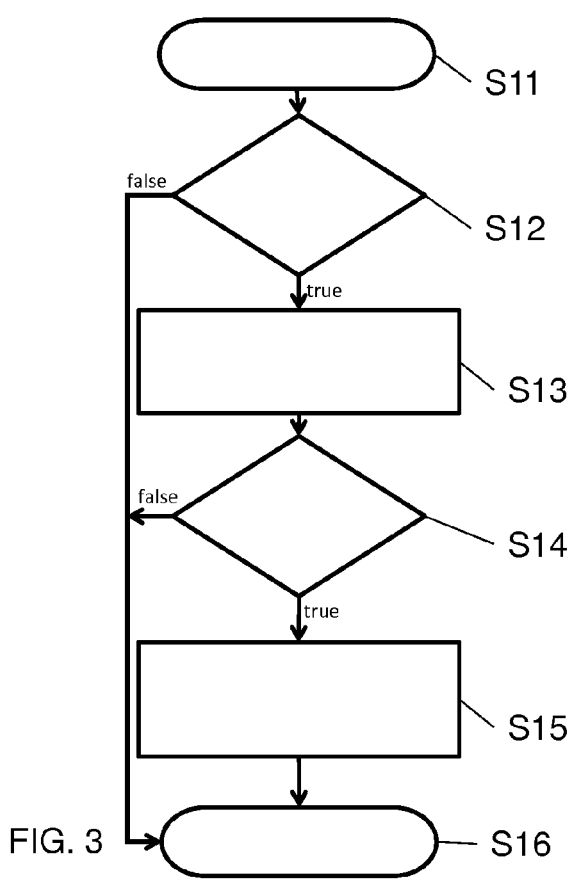
FIGS. 3, 4, 6 and 7 are flow charts of processes as used in embodiments of the present invention.

The flow chart of FIG. 3 depicts operations in response to a logical page invalidation which is being executed on every logical page write. The subject executing this process may be referred to as delay engine, which finally may be implemented in a memory controller. Specifically, this method operates on a circular buffer such as is shown in FIG. 2.

In operation S11, a logical page write request is received, e.g., a portion of data is requested to be written to the memory space. In operation S12, it is verified, if a logical-to-physical mapping exists for the subject logical page. This implies that is it verified on page level if the portion of data to be written is an update to data already stored in the memory space, or if it is new data never stored before in the subject memory space. In case a logical-to-physical mapping does not exist—which, for example, may be verified by means of a logical-to-physical mapping table maintained for the subject memory space—there is no need for exempting this unit from reclamation given that present approach acts on the assumption that data updated at a point in time will face additional updates in the near future. Hence, in this case (false), the delay engine returns to a reclaiming engine in operation S16. The reclaiming engine may be an engine managing the unit reclaiming process and as such may finally be implemented in the memory controller.

However, in case the logical page requested to be written does exist (true), which means that the data is an update to existing logical data, in operation S13 the previous logical-to-physical mapping is invalidated given that the existing data no longer is up to date, the unit this logical page belongs to is identified, and a counter counting the number of invalid pages in the unit is increased.

In operation S14 it is verified, if the corresponding unit is invalidated for the first time, i.e., if the invalidation of the subject page is the first invalidation of a page in the unit, or, provided a counter for invalid pages exists for the unit, if the counter=1. If the unit is not invalidated for the first time (false), the delay engine returns to the reclaiming engine in operation S16 under the assumption that the present unit is already addressed by the delay engine and already sits in the second pool according to FIG. 2 waiting for a release back into the first pool, for example. However, in case the unit is updated for the first time (true), further updates to this logical page may be experienced in the near future such that the subject unit is removed from the first pool and is added to the second pool in operation S15. In case the second pool is set up as a circular buffer of queues as shown in FIG. 2, the subject unit is inserted at the tail of the queue the index pointer presently points at, e.g., queue i in FIG. 2. Hence, the circular buffer 21 is subsequently filled by units containing an updated page.

Figure 4:
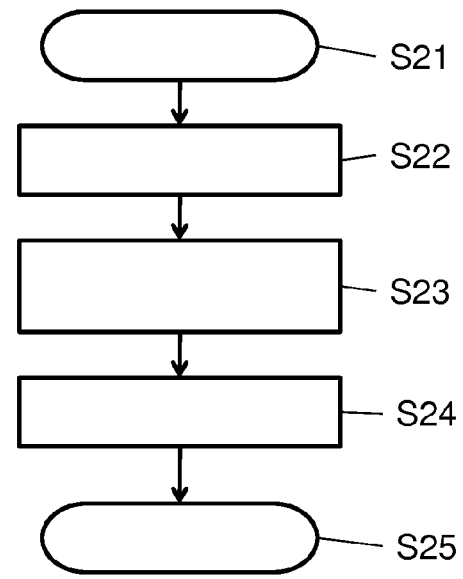

The flow diagram of FIG. 4 shows in an exemplary way the index pointer switches from pointing to a present queue to pointing to a next queue, e.g., to the queue i+1 in the example of FIG. 2. This event is initiated once the delay engine receives the information that a unit is completely written, i.e., only holds written valid or invalid pages but no longer any erased pages that would allow data to be written to. The subject unit may be any unit in the set of units. There may be an appropriate structure such as a counter assigned to every unit for counting the number of free pages. The event of a unit being written, which is represented by operation S21 in FIG. 4, is also referred to as "unit write" or "unit completed". Any unit being completely written preferably triggers an increment of the index pointer of the circular buffer in operation S22 by one. In operation S23, the next queue the index pointer now points to is drained, i.e., emptied from any unit residing therein. These units are handed over back to the first pool in operation S24 as will also explained in more detail later on. Finally, in operation S25, the delay engine hands over control to the reclaiming engine.

Whenever a unit is removed from the second pool, it has seen a number of X written units while residing in the second pool. X is referred to a size of the circular buffer, i.e., in the above embodiment to the number of X queues contributing to the circular buffer. As a result, the delay structure used in this embodiment delays a unit from being evaluated for garbage collection by the number of X unit writes which equals the number of logical writes before the subject unit will be evaluated for garbage collection.

Hence, returning to the circular buffer 21 of FIG. 2, units are preferably placed at the tail of the current queue upon their first invalidation. Each unit may then be delayed for at least X times N pages writes with N denoting the number of pages per unit as follows: The index pointer 11 pointing at the current queue i is incremented upon each unit write. The next queue i+1 contains units that have seen exactly X unit writes (equaling X*N pages writes) since these units had been placed in this next queue i+1 when the index pointer was previously pointing at them, which is exactly X unit writes before. This next queue i+1 is then emptied. The units residing therein are returned to the first pool, before inserting new units. In an exemplary embodiment, a limit may be enforced to the total number of units residing in the second pool and as such being delayed at any one time so that the unit reclaiming never stagnates.

In an exemplary embodiment, the units residing in the second pool are delayed corresponding to the time it takes for a number of X unit writes equal to an estimated maximum length of periodicity. X preferably is set at least as big as the length the longest recurring over-write pattern within a unit in number of user-writes. However, from an implementation point of view, it may not be desired keeping track of the length of each long recurring pattern in terms of total user-writes for each unit. In an exemplary embodiment, instead of a fixed number X, a dynamically adaptive number X may be used. Preferably, X may be defined according to the following dynamic heuristic:

For each quantum do:
a. XNP max length (X in FIG. 3)=min(max-threshold, max-overwrites-for-full-invalidation)
b. max-overwrites-for-full-invalidation=0
c. Upon each full LEB invalidation detect the number of user writes it took until it reached the full invalidated state and update the max-overwrites-for-full-invalidation accordingly In this context, the "quantum" is considered an appropriate time measure at which the values are re-evaluated, e.g., a day. The "max-threshold" refers to a maximum allowed size of the X value so that the block reclaiming is guaranteed to never starve. If, for example, the length of the circular buffer is equal or bigger than the total number of units in the set then the block reclaiming process will starve. The "max-overwrites-for-full-invalidation" refers to a maximum number of writes it took to fully invalidate a unit in the quantum currently being evaluated.

As endurance of an SSD is sensible to a time interval between program/erase cycles the length of the queues of the circular buffer can also be designed to provide minimal dwell time guarantees.

In an exemplary embodiment, prior to identifying units for reclamation units of the set may be grouped into the first pool comprising bins. A bin may in one embodiment be understood as a container for units that have an identical or a similar number of invalid pages at a given time. The number of bins may be predefined and/or may be (re-) defined during operation. For instance, in a system that uses a unit size of 256 which shall mean that each unit of the set contains 256 pages, the system which may include a memory controller may choose to use 4 bins, where the first bin contains units that have between 0 and 64 invalid pages, the second bin contains units that have between 64 and 127 invalid pages, the third bin contains units that have between 128 and 195 invalid pages and the fourth bin contains units that have between 196 and 256 invalid pages. The fences between the bins may be referred to as thresholds. In the present case the thresholds are set to thr1=64, thr2=128, thr3=196. Ranges defined by the thresholds preferably do not overlap which results in each unit belonging to only one bin at any given time. Preferably, the number of bins is equal to or less than the number of pages within a unit, and greater than 1.

Figure 5:
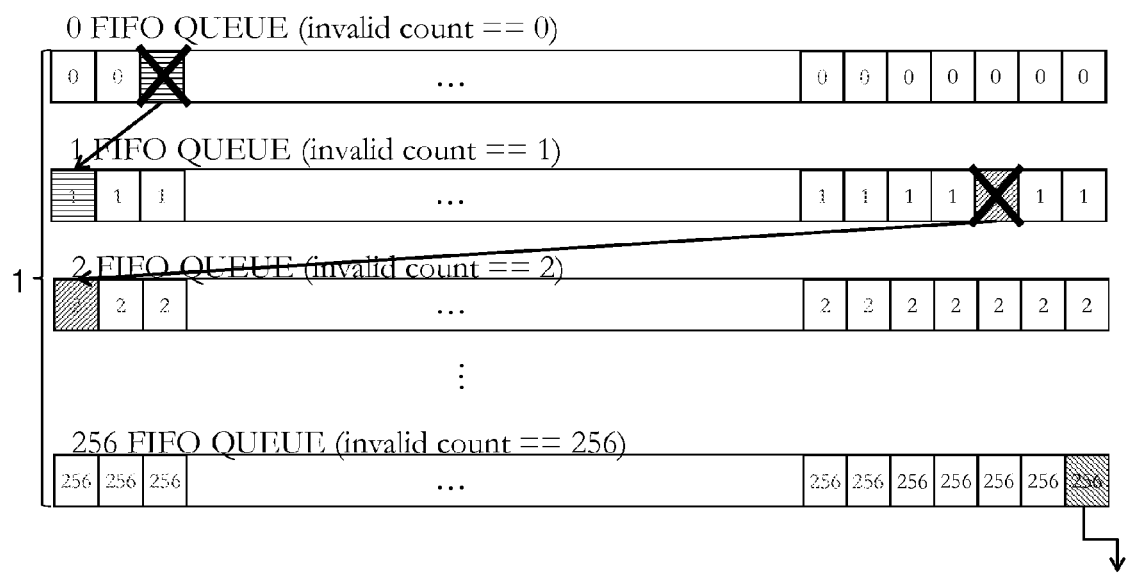
FIGS. 5 and 8 are data structures as used in embodiments of the present invention.

FIG. 5 schematically illustrates a first pool 1 containing bins according to an embodiment of the present invention. Here, the number of bins is equal to the number of pages within a unit, which is 256. Each bin may be understood as FIFO (First-In-First-Out) queue. In the diagram of FIG. 5, each bin holds units with exactly the number of invalid pages the respective bin stands for. All the squares in a bin/queue are meant to represent units. In the present example, a page of a unit residing in bin 0 becomes invalidated which makes this unit move to bin 1, which includes removing the unit from bin 0 and adding this unit with the new invalidate count to the head of bin 1. Another example is illustrated for a unit moving from bin 1 to bin 2 owed to the increment of the invalidate count for this unit. Preferably, any unit added to a bin is therefore added to the head of the queue. This implies that at the tail of the queue units can be found that have spent a longer time in the queue than units at the head of the queue. In case a unit is to be reclaimed, the one or more units from the tail of the highest ranking bin/queue is selected for reclamation. This is indicated by the arrow departing from the unit at the tail of the queue 256, which in this example is the unit to be reclaimed.

Figure 6:
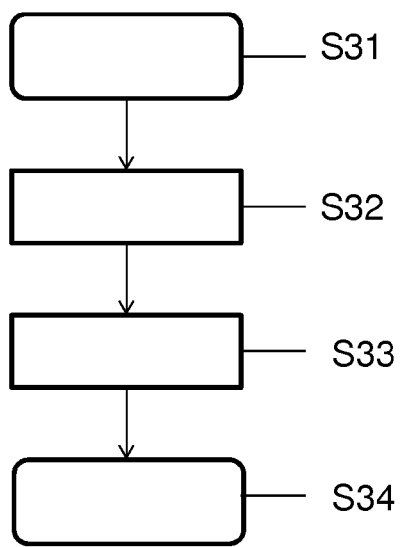

In any of the embodiments of applying a bin structure for sorting the units qualifying for an erasure, in a first operation a unit requires to enter the bin structure. This may happen if the subject unit no longer is offering erased pages to write user data to. In response to this event, the number of presently invalid pages in this unit is determined or, in case a counter n_invalid is maintained for providing this information, this current invalidation counter is checked. In a next operation, a bin is chosen based in the counter n_invalid and based on the thresholds for the bins. However, by having a delay structure introduced a unit destage process, a unit may also enter the bin structure from the second pool, as is shown in the flowchart of FIG. 6: In operation S31 the event is identified that one of the units in the system/of the set of units no longer offers erased pages to write user data to. In response to this event, in operation S32 an index pointer pointing to a presently selected queue of the circular buffer of FIG. 2, for example, may be incremented by one and as a result pointing to the next queue. In case the index pointer was pointing to the last queue of the circular buffer, the index pointer is set back to the first queue of the circular buffer. Provided the next queue is not empty, the number of invalid pages, which may be derived from the n_invalid counter, may be determined for each of the units of this next queue and dependent on the number of invalid pages, each such unit is assigned to a bin of the first pool and is destaged thereto which includes adding this unit to the assigned bin in the first pool and removing the unit from this next queue in the second pool, all in operation S33. Specifically, each unit may be placed at the tail of the chosen bin when the bins are populated according to time of insertion. In operation S34, the delay engine may hand over to the reclaiming engine.

In the context of operating the reclaiming process, and specifically of running the bin pool, pages of units may be invalidated, for example in response to data that are written or updated in response to a user write request and the new updated data may be written out-of-place. Preferably, upon invalidation of a page the unit is identified the invalidated logical page belongs to. This unit's invalidation counter n_invalid is increased by one, and a new bin is chosen for this unit dependent on the increased counter n_invalid and the threshold of the bin structure. The subject unit may then be placed in the new bin at its tail and be removed from the old bin. According to an embodiment of the invention, the method as explained in connection with FIG. 3 is applied, preferably with the following extension: If in operation S14 it is verified that the page already contains invalidated pages, i.e., the present invalidation is not the first invalidation for the unit (false), then it is verified, if this unit already resides in the delay structure. If so, nothing needs to be done. If not, the unit is integrated into the bin structure according to the mechanism explained above: The bin is selected based on the number of invalid pages in the unit, i.e., based on the n_invalid counter, and based on the thresholds of the bin structure.

In case the reclaiming structure is embodied as a bin structure, the number of bins available is in a range between 1 and the number of pages in a unit. If the number of bins is equal to 1 then the binning algorithm boils down to a simple single FIFO-queue unit reclaiming scheme. If the number of bins is equal to the number of pages in a unit then for uniform random workloads the binning algorithm optimally sorts units. In an exemplary embodiment, a number of bins is significantly lower than the upper bound and preferably is between 2 and 10, and very preferred 4.

When using a bin structure as reclaiming structure, thresholds between the bins indicate the number of invalid pages upon which units migrate from lower to higher bins. In one embodiment, the thresholds are static and evenly distribute the units' invalidity count into bins, which is presently preferred for uniformly-random workloads.

For skewed workloads thresholds with higher resolution at the lower invalidity counts may be more effective, e.g., for 4 bins and a unit size of 256 pages, suitable thresholds may be at THR1=32, THR2=64, THR3=128. In a further embodiment, the thresholds between the bins a adapted dynamically, i.e., over time, subject to the workload behavior, for example.

Figure 7:
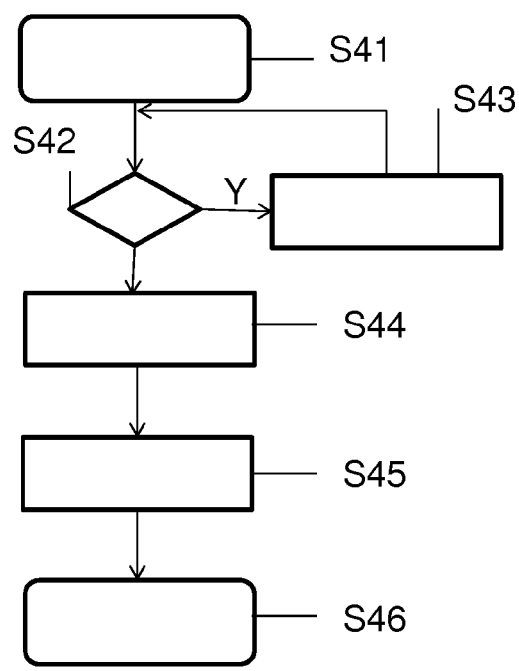

FIG. 7 illustrates an embodiment of a unit reclaiming process in form of a flowchart. In operation S41, the triggering event for a unit reclamation may be, for example, that a number of free units available in a third pool is less than a first threshold. For this purpose, the number of free units in the third pool may be monitored. A free unit typically is understood as a unit having all pages erased and ready to be written.

In case this event is identified in operation S41, the reclaiming process starts at the highest ranking bin, e.g., the fourth bin in one of the above examples, and investigates in operation S42 if the bin is empty or not. If this bin is empty (Y), the bin number to be investigated is reduced in operation S43 such that in operation S42 the next lower bin, i.e., the third bin in the above example, is investigated, if it is empty, and so on. If one of the bins investigated is determined not to be empty (N) in the verification operation S42, the oldest unit in this bin is selected for erasure in operation S44. In operation S45, any valid pages in this selected unit are identified and relocated prior to having this unit erased in operation S46 and assigned this erased unit to the pool of free units.

Figure 8:
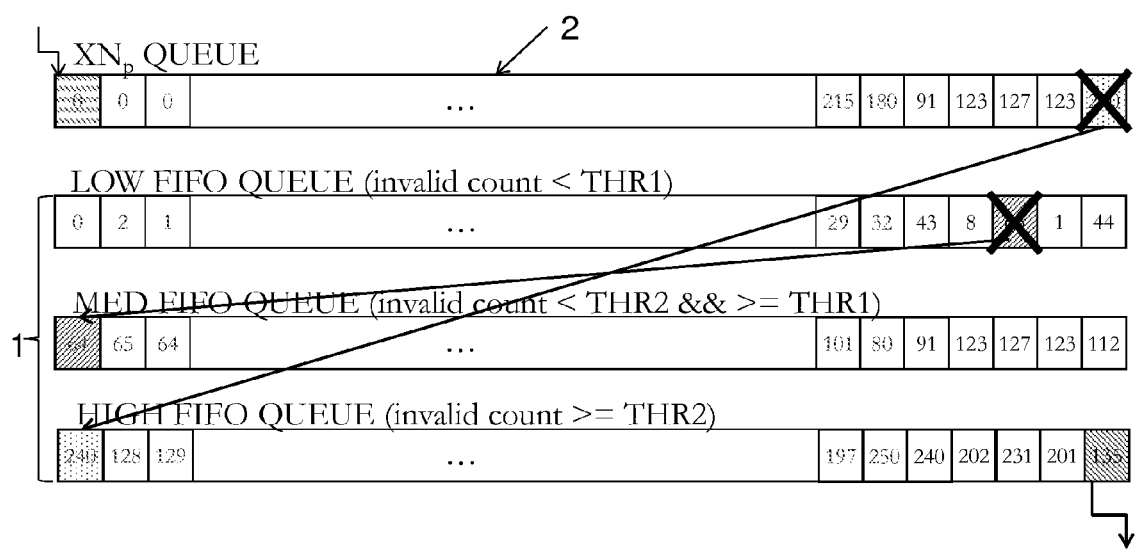

FIG. 8 illustrates another first pool 1 according to an embodiment of the present invention. The present first pool 1 has a bin structure with the range of invalid pages per unit being distributed into three bins, i.e., a low invalid count bin for units with less than THR1 invalid pages, a medium invalid count bin for units having equal to or more than THR1 but less than THR2 invalid pages, and a high invalid count bin for units having equal to or more than THR2 invalid pages.

Again, each bin may be understood as a FIFO (First-In-First-Out) queue. All the squares in a bin/queue are meant to represent units. Whenever one or more pages of a unit residing in the low invalid count bin become invalidated and make the invalidate count equal to or exceed THR1, this unit will be moved to the medium invalid count bin, and preferably its head, as is illustrated by the arrow. And again, in case a unit shall be reclaimed, the one or more units from the tail of the invalid count bin is selected for reclamation. This is indicated by the arrow departing from the unit at the tail of the queue 256, which in this example shall be reclaimed.

In FIG. 8, another structure for a second pool 2 is introduced. The second pool 2 includes a single fixed-length queue referred to $XN_p$ in form of a First-In-First-Out (FIFO) buffer, without any additional data structures such as counters etc. assigned thereto. Upon a units first logical page invalidation this unit may be added to the head of the $XN_p$ queue and may push the other units therein one position ahead. At the same time, the unit at the end/tail of the $XN_p$ queue will leave the $XN_p$ queue and move back to the first pool 1. For this purpose, the number of invalid pages of this unit will be determined and the unit will be inserted into one of the bins of the first pool 1 dependent on the presently invalid count. In the present example, this unit contains 240 invalid pages and therefore will be added to the head of the high invalid count bin. This makes a unit in the second pool 2 be delayed from being considered for reclamation in the first pool 1 for a number of observed unit first logical page invalidations equal to the length of the $XN_p$ queue as opposed to a number of observed user writes.

In another embodiment, the delay structure comprises a single queue as opposed to an array of queues, however, including a timing means in terms of unit writes. In such a delay structure, a global reference write timestamp is maintained which in one embodiment may take the form of a counter that is incremented upon each unit write and hence shows the number of unit writes in the set of units so far. It is preferred that each unit added to the queue is assigned a timestamp, equal to a value of the global reference write timestamp at the time of the write, which timestamp is then being used upon a unit destage/removal from the delay structure to decide whether another unit is taken out of the queue or not. Hence, when moving a unit from the first pool to the second pool a timestamp is assigned to this unit for indicating the number of writes in the set of units at the time of the move. In response to a unit of the set being written, a subset of units is then determined from the single queue the subset comprising all units with a timestamp equal to a current value of the global reference write timestamp minus a defined number X of units to be written for delay purposes. This makes the units be removed to the first pool that have waited for a defined number of writes X in the second pool. These units are then removed from the queue of the second pool and inserted into the first pool. Note that because of the FIFO structure of the single queue and the monotonically increasing global reference write timestamp the units in the queue are sorted in terms of their write timestamp counter, i.e., any unit in the queue will have a timestamp greater or equal to the timestamp of a unit inserted in the queue at a later point in time.

In another embodiment of the present invention, two circular buffers may be used as a second pool when applying a concept referred to as heat segregation. In this concept, logical pages are marked based on their heat in terms of write-frequency. In an exemplary embodiment, logical pages of similar heat may be proactively grouped into the same unit that sooner or later becomes reclaimed. Such grouping may reduce write amplification. Preferably, a page is classified according to an access frequency to this page into a "hot" page or a "cold" page, i.e., an often accessed page compared to a less often accessed page. Such separation may be implemented dependent on a threshold for the accesses per time. Preferably, the second pool may contain two circular buffers: One for "hot" units and one for "cold" units. In that case the above procedures may run for each of the circular buffers. Moreover, it is preferred to keep track of two maximum numbers of user writes for full invalidation of a unit, one for a "hot" unit and one for a "cold" unit.

In an exemplary embodiment, heat segregation is applied by introducing the following structures and operations: A write-frequency counter is maintained per logical page. In response to a logical page write the write-frequency counter is incremented. Upon a logical page relocate owed to unit reclaiming the write-frequency counter is decremented.

Preferably, N heat-levels are supported, i.e., access frequencies to a logical page are classified into N classes/heat-levels, wherein N is lower or equal to the resolution of the logical page write-frequency counter. This entails supporting N units open for write at any point in time. Upon a logical page write or relocate the write-counter frequency of that logical page is mapped to a heat level and the logical page is placed in a unit of that heat-level. Two circular buffers are maintained in the second pool, one for "hot" units and one for "cold" units.

The above embodiments reduce write amplification and at the same time improve performance and endurance of the memory. In particular, when in addition to the second pool a binning structure is applied as first pool, and possibly also heat segregation is integrated, write amplification may be significantly reduced. Any of the above embodiments can be effectively applied to any storage controller that employees out-of-place writes in a log-structured manner and relies on garbage collection for free space reclamation.

As will be appreciated by one skilled in the art, aspects of the present invention may be embodied as a device, method or computer program product. Accordingly, aspects of the present invention, in particular in form of the controller, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention, such as the read and write methods, may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method for managing a memory, the memory comprising a set of units and a unit comprising a set of pages, wherein a unit of the set of units is erasable as a whole by a unit reclaiming process resulting in a free unit available for writing data to, and wherein data updates are performed by writing data updates out-of-place, wherein data updates to outdated data are written to a page different from a page containing the outdated data, and wherein the page containing the outdated data is invalid, while a page containing up-to-date data is a valid page, the method comprising:
    maintaining a first pool of units available for reclamation by the unit reclaiming process, wherein the first pool comprises a plurality of bins equal to a number of pages within the unit, each bin being reserved for units comprising a number of invalid pages associated with the subject bin, wherein in response to a trigger event the unit reclaiming process selects a unit from the bin populated with the units containing the highest number of invalid pages for reclamation, and wherein the unit selected is the unit first entered into the bin populated with the units containing the highest number of invalid pages for reclamation;
    maintaining a second pool of units not available for reclamation by the unit reclaiming process;
    moving a first unit from the first pool to the second pool in response to invalidating a first one of the pages contained in the first unit;
    returning the first unit from the second pool to the first pool after a defined number of units of the set have been written;
    selecting a unit out of the first pool for reclamation by the unit reclaiming process;
    in response to a first page of a given unit being invalidated, starting a count for the given unit to count all the number of user writes sent to the memory; and
    in response to all the pages of the given unit becoming invalidated, replacing a maximum log count with the count for the given unit when the count for the given unit is greater than the current maximum log count.

2. The method of claim 1, wherein a unit of the set is written once the unit solely comprises either valid or invalid pages.

3. The method of claim 1, wherein the second pool comprises a circular buffer of queues for buffering units therein, and an index pointer for pointing at one of the queues, and moving a first unit from the first pool to the second pool comprises removing the first unit from the first pool and adding the first unit to the queue the index pointer presently points at.

4. The method of claim 3, wherein the index pointer is incremented for pointing at a next queue of the circular buffer in response to a unit of the set being written.

5. The method according to claim 4, further comprising, in response to the index pointer being incremented to point to the next queue, returning all units arranged in the next queue to the first pool by removing the units from the next queue and adding the units to the first pool.

6. The method of claim 1, wherein:
    the second pool comprises a single queue for buffering units therein;
    moving a unit from the first pool to the second pool comprises removing the first unit from the first pool, adding the first unit to the single queue and assigning a timestamp to the first unit for indicating a number of units of the set written until the move;
    in response to a unit of the set being written, a subset of units is determined from the single queue comprising all units with a timestamp equal to a current value of a reference write timestamp indicating a number of written units in the set, minus a defined number of units to be written for delay purposes; and
    the determined subset of units is returned to the first pool by removing the units thereof from the single queue and adding the units to the first pool.

7. The method of claim 1, wherein:
    valid pages of the unit selected is relocated to other units, wherein after relocation the unit is erased.

8. The method according to claim 7, wherein the trigger event is defined by a number of units in a third pool falling below a threshold, the third pool comprising units being erased and not yet written.

9. The method according to claim 7, wherein returning a unit from the second pool to the first pool comprises determining one of the bins for adding the unit to dependent on a present number of invalid pages in the first unit, and adding the first unit to the determined bin.

10. The method of claim 1, wherein the second pool is limited to containing X number of units, X being a natural number.

11. The method of claim 10, wherein the value of X is continuously re-evaluated after a pre-determined period of time, and the value of X is chosen based on a maximum logged number recorded during the pre-determined period of time.

12. A method for managing a memory, the memory comprising a set of units and a unit comprising a set of pages, wherein a unit of the set of units is erasable as a whole by a unit reclaiming process resulting in a free unit available for writing data to, and wherein data updates are performed by writing data updates out-of-place, wherein data updates to outdated data are written to a page different from a page containing the outdated data, and wherein the page containing the outdated data is invalid, while a page containing up-to-date data is a valid page, the method comprising:

maintaining a first pool of units available for reclamation by the unit reclaiming process, wherein the first pool comprises a plurality of bins equal to a number of pages within the unit, each bin being reserved for units comprising a number of invalid pages associated with the subject bin, wherein in response to a trigger event the unit reclaiming process selects a unit from the bin populated with the units containing the highest number of invalid pages for reclamation, and wherein the unit selected is the unit first entered into the bin populated with the units containing the highest number of invalid pages for reclamation;

maintaining a second pool of units not available for reclamation by the unit reclaiming process, which second pool comprises a First-In-First-Out buffer;

moving a first unit from the first pool to the second pool in response to invalidating a first one of the pages contained in the first unit;

in response to moving the first unit from the first pool to the second pool returning another unit from the second pool to the first pool;

selecting a unit out of the first pool for reclamation by the unit reclaiming process;

in response to a first page of a given unit being invalidated, starting a count for the given unit to count all the number of user writes sent to the memory; and in response to all the pages of the given unit becoming invalidated, replacing a maximum log count with the count for the given unit when the count for the given unit is greater than the current maximum log count.

13. A computer program product comprising a non-transitory computer readable medium having computer readable program code embodied therewith, the computer readable program code comprising computer readable program code configured to perform a method according to claim 1.

14. A memory controller for managing a memory comprising a set of units and a unit comprising a set of subunits, wherein a unit of the set of units is erasable as a whole by a unit reclaiming process resulting in a free unit available for writing data to, and wherein data updates are performed by writing data updates out-of-place, wherein data updates to outdated data are written to a subunit different from a subunit containing the outdated data; and wherein the subunit containing the outdated data is invalid, while a subunit containing up-to-date data is a valid subunit, wherein the memory controller is configured to:

maintain a first pool of units available for reclamation by the unit reclaiming process, wherein the first pool comprises a plurality of bins equal to a number of pages within the unit, each bin being reserved for units comprising a number of invalid pages associated with the subject bin, wherein in response to a trigger event the unit reclaiming process selects a unit from the bin populated with the units containing the highest number of invalid pages for reclamation, and wherein the unit selected is the unit first entered into the bin populated with the units containing the highest number of invalid pages for reclamation;

maintain a second pool of units not available for reclamation by the unit reclaiming process;

move a first unit from the first pool to the second pool in response to invalidating a first one of the pages contained in the first unit;

return the first unit from the second pool to the first pool after a defined number of units of the set have been written;

select a unit out of the first pool for reclamation by the unit reclaiming process;

in response to a first page of a given unit being invalidated, starting a count for the given unit to count all the number of user writes sent to the memory; and in response to all the pages of the given unit becoming invalidated, replacing a maximum log count with the count for the given unit when the count for the given unit is greater than the current maximum log count.

15. The memory controller of claim 14, wherein:

the second pool comprises a circular buffer of queues for buffering units therein, and an index pointer for pointing at one of the queues; and wherein the memory controller is configured to move a unit from the first pool to the second pool by removing the first unit from the first pool and adding the first unit to the queue the index pointer presently points at.

16. The memory controller of claim 15, wherein the memory controller is further configured to:

increment the index pointer for pointing at a next queue of the circular buffer in response to a unit of the set being written; and return all units arranged in the next queue to the first pool in response to the index pointer being incremented for pointing to the next queue.

17. The memory controller according to claim 16, wherein, in response to the index pointer being incremented to point to the next queue, all units arranged in the next queue are returned to the first pool by removing the units from the next queue and adding the units to the first pool.

18. The memory controller of claim 14, wherein:

the second pool comprises a single queue for buffering units therein;

a unit from the first pool is moved to the second pool by removing the first unit from the first pool, adding the first unit to the single queue and assigning a timestamp to the first unit for indicating a number of units of the set written until the move;

in response to a unit of the set being written, a subset of units is determined from the single queue comprising all units with a timestamp equal to a current value of a reference write timestamp indicating a number of written units in the set, minus a defined number of units to be written for delay purposes; and the determined subset of units is returned to the first pool by removing the units thereof from the single queue and adding the units to the first pool.

19. The memory controller of claim 14, wherein:

valid pages of the unit selected is relocated to other units, wherein after relocation the unit is erased.

20. The memory controller according to claim 19, wherein the trigger event is defined by a number of units in a third pool falling below a threshold, the third pool comprising units being erased and not yet written.

21. The memory controller according to claim 19, wherein returning a unit from the second pool to the first pool comprises determining one of the bins for adding the unit to dependent on a present number of invalid pages in the first unit, and adding the first unit to the determined bin.

22. A method for managing a memory, the memory comprising a set of units and a unit comprising a set of pages, wherein a unit of the set of units is erasable as a whole by a unit reclaiming process resulting in a free unit available for writing data to, and wherein data updates are performed by writing data updates out-of-place, wherein data updates to outdated data are written to a page different from a page containing the outdated data, and wherein the page containing the outdated data is invalid, while a page containing up-to-date data is a valid page, the method comprising:

maintaining a first pool of units available for reclamation by the unit reclaiming process, wherein the first pool comprises a plurality of bins equal to a number of pages within the unit, each bin being reserved for units comprising a number of invalid pages associated with the subject bin, wherein in response to a trigger event the unit reclaiming process selects a unit from the bin populated with the units containing the highest number of invalid pages for reclamation, and wherein the unit selected is the unit first entered into the bin populated with the units containing the highest number of invalid pages for reclamation;

maintaining a second pool of units not available for reclamation by the unit reclaiming process;

moving a first unit from the first pool to the second pool in response to invalidating a first one of the pages contained in the first unit;

returning the first unit from the second pool to the first pool after a defined number of units of the set have been written; and selecting a unit out of the first pool for reclamation by the unit reclaiming process, wherein the second pool is limited to containing X number of units, X being a natural number, wherein the value of X is continuously re-evaluated after a pre-determined period of time, wherein the value of X is chosen based on a maximum log count recorded during the pre-determined period of time, and wherein, in response to the value of X being chosen, the maximum log count is reset to 0.

23. A computer program product for managing a memory, the memory comprising a set of units and a unit comprising a set of pages, wherein a unit of the set of units is erasable as a whole by a unit reclaiming process resulting in a free unit available for writing data to, and wherein data updates are performed by writing data updates out-of-place, wherein data updates to outdated data are written to a page different from a page containing the outdated data, and wherein the page containing the outdated data is invalid, while a page containing up-to-date data is a valid page, the computer program product comprising:

a computer readable storage medium having program instructions embodied therewith, wherein the computer readable storage medium is not a transitory signal per se, the program instructions executable by a processing device to cause the processing device to perform a method comprising:

maintaining, by the processing device, a first pool of units available for reclamation by the unit reclaiming process, wherein the first pool comprises a plurality of bins equal to a number of pages within the unit, each bin being reserved for units comprising a number of invalid pages associated with the subject bin, wherein in response to a trigger event the unit reclaiming process selects a unit from the bin populated with the units containing the highest number of invalid pages for reclamation, and wherein the unit selected is the unit first entered into the bin populated with the units containing the highest number of invalid pages for reclamation;

maintaining, by the processing device, a second pool of units not available for reclamation by the unit reclaiming process;

moving, by the processing device, a first unit from the first pool to the second pool in response to invalidating a first one of the pages contained in the first unit;

returning, by the processing device, the first unit from the second pool to the first pool after a defined number of units of the set have been written; and selecting, by the processing device, a unit out of the first pool for reclamation by the unit reclaiming process, wherein the second pool is limited to containing X number of units, X being a natural number, wherein the value of X is continuously re-evaluated after a pre-determined period of time, wherein the value of X is chosen based on a maximum log count recorded during the pre-determined period of time, and wherein, in response to the value of X being chosen, the maximum log count is reset to 0.

* * * * *